(12) United States Patent
Kennedy-Foster

(10) Patent No.: US 11,107,310 B2
(45) Date of Patent: Aug. 31, 2021

(54) METHOD AND SYSTEM FOR ACCESS SYSTEMS

(71) Applicant: Carrier Corporation, Palm Beach Gardens, FL (US)

(72) Inventor: Ashley Kennedy-Foster, Henrietta, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/934,302

(22) Filed: Jul. 21, 2020

(65) Prior Publication Data

US 2021/0027562 A1    Jan. 28, 2021

Related U.S. Application Data

(60) Provisional application No. 62/877,100, filed on Jul. 22, 2019.

(51) Int. Cl.
| | |
|---|---|
| *G06F 7/04* | (2006.01) |
| *G07C 9/28* | (2020.01) |
| *H04B 17/318* | (2015.01) |
| *G07C 9/00* | (2020.01) |

(52) U.S. Cl.
CPC .......... *G07C 9/28* (2020.01); *G07C 9/00309* (2013.01); *H04B 17/318* (2015.01); *G07C 2009/00396* (2013.01)

(58) Field of Classification Search
CPC .................. G07C 9/28; G07C 9/00309; G07C 2009/00396; H04B 17/318
See application file for complete search history.

(56) References Cited

U.S. PATENT DOCUMENTS

| | | | | |
|---|---|---|---|---|
| 5,661,286 A | * | 8/1997 | Fujioka | G07C 9/28 235/382 |
| 8,400,269 B2 | * | 3/2013 | Tuttle | G06K 7/10316 340/10.1 |
| 9,196,104 B2 | | 11/2015 | Dumas et al. | |
| 9,311,656 B2 | | 4/2016 | Barnes, Jr. | |
| 9,336,637 B2 | | 5/2016 | Neil et al. | |
| 9,384,608 B2 | | 7/2016 | Strulovitch et al. | |
| 9,443,365 B2 | | 9/2016 | Ahearn et al. | |

(Continued)

FOREIGN PATENT DOCUMENTS

| | | |
|---|---|---|
| CN | 104103111 A | 10/2014 |
| CN | 105809777 A | 7/2016 |

(Continued)

OTHER PUBLICATIONS

U.S. Non-Final Office Action for U.S. Appl. No. 16/926,266, dated Mar. 29, 2021. 19 Pages.

*Primary Examiner* — Munear T Akki
(74) *Attorney, Agent, or Firm* — Cantor Colburn LLP

(57) ABSTRACT

Aspects of the invention are directed towards method system and devices assisting a user in providing seamless access to a user through an access point of the access system. The invention describes adjusting the threshold signal strength used by the user terminal to access an access point. The adjustment to the threshold signal strength is determined by determining a change in the time interval based on different time stamps. The different time stamps are registered when a user with the user terminal attempts to access the access point.

20 Claims, 4 Drawing Sheets

(56) References Cited

U.S. PATENT DOCUMENTS

| | | | |
|---|---|---|---|
| 9,483,887 B1 * | 11/2016 | Soleimani | G07C 9/00571 |
| 9,697,661 B1 | 7/2017 | Dumas et al. | |
| 9,704,314 B2 | 7/2017 | Johnson et al. | |
| 9,916,746 B2 | 3/2018 | Johnson et al. | |
| 9,940,490 B1 * | 4/2018 | Robshaw | H04L 9/3247 |
| 10,089,807 B2 | 10/2018 | Pluss et al. | |
| 10,096,185 B2 | 10/2018 | Pluss et al. | |
| 10,186,095 B2 | 1/2019 | Dehnert et al. | |
| 10,198,884 B2 | 2/2019 | Johnson | |
| 10,249,122 B1 * | 4/2019 | Aksamit | G01S 11/06 |
| 2006/0136997 A1 | 6/2006 | Telek et al. | |
| 2010/0075656 A1 | 3/2010 | Howarter et al. | |
| 2010/0148918 A1 * | 6/2010 | Gerner | G07C 9/00309 |
| | | | 340/5.2 |
| 2012/0092129 A1 | 4/2012 | Lickfelt | |
| 2013/0027180 A1 * | 1/2013 | Lakamraju | G07C 9/257 |
| | | | 340/5.53 |
| 2015/0048927 A1 | 2/2015 | Simmons | |
| 2015/0199859 A1 * | 7/2015 | Ouyang | H04L 9/14 |
| | | | 340/5.61 |
| 2017/0301166 A1 | 10/2017 | Earles et al. | |
| 2019/0019365 A1 | 1/2019 | Lee | |
| 2020/0168017 A1 | 5/2020 | Prostko et al. | |
| 2020/0351661 A1 | 11/2020 | Kuenzi et al. | |
| 2021/0019966 A1 | 1/2021 | Jarugumilli et al. | |

FOREIGN PATENT DOCUMENTS

| | | |
|---|---|---|
| CN | 106981108 A | 7/2017 |
| CN | 107103673 A | 8/2017 |
| CN | 108230504 A | 6/2018 |
| WO | 2018025086 A1 | 2/2018 |
| WO | 2019039746 A1 | 2/2019 |

* cited by examiner

METHOD AND SYSTEM FOR ACCESS SYSTEMS

CROSS-REFERENCE TO RELATED APPLICATIONS

This application claims the benefit of U.S. Provisional Patent Application Ser. No. 62/877,100, filed Jul. 22, 2019, the entire contents of which are incorporated herein by reference.

TECHNICAL FIELD OF INVENTION

The present invention relates generally to security systems. More particularly, the invention relates to an apparatus and method for providing seamless access to the user through an access control system.

BACKGROUND OF THE INVENTION

In an Access Control System, the doors may contain Bluetooth enabled devices/readers. Users are generally issued a Radio Frequency Identification (RFID) card which is placed on the Bluetooth reader in order to open the door. The RFID card can be replaced by a mobile application. The mobile application can send user credentials from the mobile device using the built-in Bluetooth hardware. But, the user needs to be present within a signal strength from the Bluetooth enabled device in order to access it. More often than not, it is tedious to accurately identify the appropriate signal strength.

Moreover, when dealing with seamless digital credentials and access, in order to have the best experience, users need to understand Bluetooth signal strength and also guess the strength required to give them enough time to pass through the door or an entrance. The Bluetooth signal strength needs to take into account of interference like a book bag, pocket, or a corner wall that affects the signal strength. In order to fine tune the experience, users mostly revisit the configuration user interface to adjust signal strength to get the desired state for seamless access. Revisiting the user interface to make adjustments is troublesome. More troublesome is the fact that this procedure needs to be repeated for each and every door or access point.

The access control systems enabled with Bluetooth readers are also dependent on appropriate signal strength required for establishing communication between the mobile device and the access control system. The signal strength increases as the proximity of the mobile device with the access control system decreases. Thus, the signal strength is required to be considered for providing seamless access to the users.

Therefore, there is a need in the art to develop methods and systems for providing mechanisms to seamlessly access the access control systems without any friction.

SUMMARY OF THE INVENTION

Various embodiments of the invention describe an access system for providing a user with a seamless physical access through access points secured by the access system. The access system comprises an access control unit for setting a time interval and a threshold signal strength for accessing a secured access point of the access system by a user. The access control unit also registers time stamps for different events while a user of a user terminal accesses the access system. The access control unit is configured to change the time interval based on the time stamps. The access system further comprises an access point for receiving an access request from the user terminal at the threshold signal strength. A signal strength adjustment unit is configured to adjust the threshold signal strength for the user terminal based on the changed time interval.

In another embodiment of the invention, the access point of the access system receives the access request and the event is registered with a first time stamp. The access system comprises a controller for communicating with the access point to receive the access request. The receipt of the access request by the controller is registered as a second time stamp. The controller sends back the result of the access request to the access point. The access point further receives an actuation command for providing access. The time stamp of receipt of the actuation command is registered as a third time stamp. The access is then provided by opening an entrance associated with the access point. The opening of the entrance is registered as the fourth time stamp. The first, second, third, and fourth time stamps corresponds to time stamps for different events. Further, the first, second, third, and fourth time stamps are transmitted to the access control unit to change the time interval for the user.

In an embodiment of the invention the adjusted threshold signal strength is sent by the access system to the user terminal for the next use by the user. Accordingly, the next time when the user accesses the same access point, the access system will respond according to the adjusted threshold signal strength.

In another embodiment, the access system can send a notification to the user terminal requesting a change in the time interval.

In another embodiment of the invention the access request is automatically received by the access system on sensing the threshold signal strength.

Various embodiments of the invention describe a method for providing seamless access of a user through an access system. The method describes setting a time interval to access an access point of the access system by a user. The method further describes determining a threshold signal strength for transmitting an access request from the user terminal to the access system. The access request is received by the access system from the user terminal. During the access of the access point by the user different time stamps for different events are registered by the access system. The method determines the adjusted threshold signal strength by changing the time interval based on the time stamps registered by the access system.

In an embodiment of the invention, the access point receives the access request and registers a first time stamp based on the access request.

In another embodiment of the invention, wherein the access system further comprises a controller for communicating with the access point to receive the access request and to register a second time stamp associated with the access request, wherein the controller sends the result of the access request to the access point.

In an embodiment of the invention, the access point is further configured to receive an actuation command to provide access and register a third time stamp associated with the actuation command and provide the access and register a fourth time stamp associated with providing the access.

In another embodiment of the invention, the first, second, third, and fourth time stamps corresponds to time stamps for different events, wherein the first, second, third, and fourth time stamps are transmitted to the access control unit to change the time interval.

In an embodiment of the invention the adjusted threshold signal strength is sent by the access system to the user terminal for the next use.

In an embodiment of the invention, the threshold signal strength can be adjusted manually by a user of the user terminal.

In yet another embodiment of the invention, the access request is automatically received by the access system on sensing the threshold signal strength.

In another embodiment of the invention, the user of the user terminal can adjust the threshold signal strength by modifying the time interval on a user interface of the user terminal.

In still another embodiment of the invention, the access system is configured to send a notification to the user terminal requesting a change of the time interval.

Various embodiments of the invention describe a computer readable medium comprising one or more processors and a memory coupled to the one or more processors. The memory stores instructions which are executed by the one or more processors. The computer readable medium is configured to set a time interval to access an access point of the access system and determine a threshold signal strength for transmitting an access request from a user terminal to the access system. The computer readable medium is further configured to receive the access request from the user terminal and register time stamps for different events while accessing the access point. The computer readable medium is configured to adjust the threshold signal strength for the user terminal by changing the time interval based on the time stamps of different events.

In an embodiment of the invention the access request is automatically received by the access system on sensing the threshold signal strength.

In another embodiment of the invention the adjusted threshold signal strength is sent by the access system to the user terminal for the next use.

In yet another embodiment of the invention the access system sends a notification to the user terminal requesting a change of the time interval.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
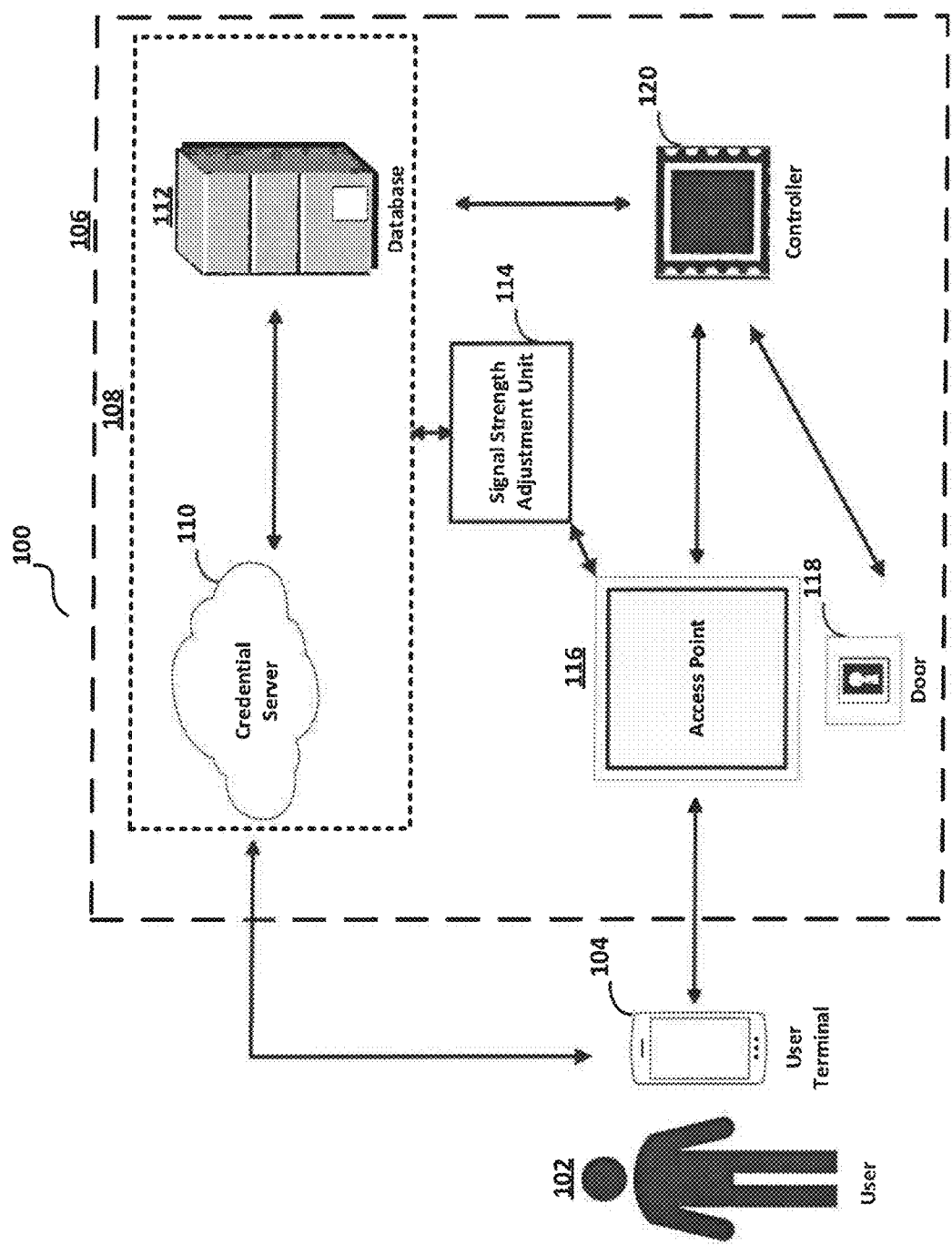
FIG. 1 is an exemplary diagram illustrating a system in accordance with an embodiment of the invention.

Described herein is the technology with systems, methods, and devices for seamless access to a user in the premises using electronic security control systems such as offices, homes, hotels and the like. In different embodiments of the invention an access system is configured to set a time interval for providing an entry inside premises to a user. The invention further determines a signal threshold strength for transmitting an access request from the user terminal to the access system. The access request is received by an access point of the access system. The access system registers time stamps of different events occurring while accessing. The access system is configured to adjust the threshold signal strength for the user terminal by changing the time interval based on the time stamps of different events.

Various embodiments of the invention describe setting a time interval for accessing an access point of an access system. Initially, the time interval may be set by an administrator of the access system or the time interval may be set as default by the access system (say 5 seconds). The time interval is a duration during a user associated with a user terminal accessing the access system is able to send the access request and gain entry inside the premises. The access system also determines or estimates a threshold signal strength at which the user terminal is able to automatically send the access request to the access system. That is, on detection of the threshold signal strength for a particular access point in the access system, the user terminal is configured to send the access request to the access system such that the entry inside the premises can be gained in a frictionless manner (without any manual effort). The threshold signal strength may be automatically set by the access system or it may also be dependent on the time interval provided by the access system to gain entry inside the premises. The access request may include the user credentials, unique code etc. required to gain access inside the premises.

Once the time interval, threshold signal strength, and the user credentials are available for a user, the user may be able to use the user terminal to gain access inside the premises. As the user approaches the access point of the access system, the user terminal may detect the threshold signal strength Immediately, the user credentials (in the request) are transmitted from the user terminal to the access system where the user request is validated. On successful validation, the access system provides a command to actuate a controller associated with the access system to open an entry to the user inside the premises. At the same time, the access system registers various time stamps while user accesses the access system. The time stamps can be related to time taken by access request to reach the access system from the user terminal, time taken by the access system to respond to the access request, time taken by the access system to grant access to the user upon validation, time taken by the access system to release a door of the entry for opening and the like. The associated time stamps for these events determine whether the initial time interval set by the access system is sufficient for the user to gain entry inside the premises. If the time interval is not sufficient, the access system adjusts the time interval for accessing the access system. Accordingly, the threshold signal strength can also be modified by the access system. Alternatively, the threshold signal strength may remain the same and only the time interval to access the entry changes. The time interval can also be modified by the user by using a user application on the user terminal. The user can provide inputs related to change in the time interval using an interface of the user terminal. The access system may also send the notification to the user terminal requesting change in the time interval. Based on the inputs from the user, the threshold signal strength may be modified.

Particularly, the access system also includes a controller which communicates with the access point. The access point receives the access request from the user terminal. The receipt of the access request from the user terminal by the access point is time stamped and can be denoted as a first time stamp. The access request is then transmitted to the controller. This event of receiving the access request by the controller is time stamped as a second time stamp. The result of the access request, that is granting or denying the user an access is received by the access point and is time stamped to a third time stamp. The result of the access request may be processed by the access control unit of the access system. The access control unit may validate the user credentials associated with the access request and return the result to the controller. The controller may then forward the result to the access point. On successful validation and grant of access from the controller, an actuation command may be received by the access point from the controller. Based on the actuation command the access or entrance associated with the access point is opened, which is time stamped as fourth time stamp. The first, second, third, and fourth time stamps are transmitted to the access control unit to determine the change in time interval for the user of the user terminal. The changed time interval is used to adjust the threshold signal strength. The adjusted threshold signal strength may be sent to the user terminal for next use when the user accesses the access point.

In an event the user is not able to gain entry within the time interval and the entry to the premises gets closed, the user terminal is configured to provide an option to the user to manually send the access request again to the access system to enter the premises.

Turning now to figures, FIG. 1 depicts a system (100) for seamless access of secured premises to a user (102) with the help of a user terminal (104). The user terminal includes a wireless communication unit (not shown) such as a Bluetooth module according to an embodiment of the invention. There is an access system (106) comprises an access control unit (108). The access control unit further comprises a credential server (110) and a database (112) communicably coupled with each other. The access control unit may include other units for processing the access requests. The access system also includes a signal strength adjustment unit (114). The access system further includes an access point (116), a controller (120) and an entrance (for example, a door) (118) to the secured premises. The access point may include a communication module which can be a Bluetooth reader to establish a communication channel with the user terminal (104). The wireless communication unit of the user terminal may communicate with the access point (116) to establish the communication channel. The wireless communication unit and the communication module are compatible with each other.

The user terminal can be any hand held device such as a smartphone or a tablet and the like with at least a display, a storage unit and a wireless connectivity, for example, a Bluetooth, as discussed above. As an example, the hand held device may be an Apple® tablet or smartphone, an Android® tablet or smartphone, a Windows® tablet or smartphone and/or the like. According to an embodiment of the invention, the user terminal may communicate the user credentials directly with the credential server (110) or via the controller (120) and the access point (116). The user terminal (104) can automatically transmit the access request including user credentials to gain access to the secured premises through the door (118). In general, an operating system is available on the user terminal which provides the framework to install user applications on the user terminal. The user terminal may include a user application related to the access system that provides an interface for the user to communicate with the access system. In an example, the operating system installed on the hand held device or the user terminal is an Android® based operating system, a Window® based operating system, and an Apple® based operating system or any other operating system known in the art.

Figure 2:
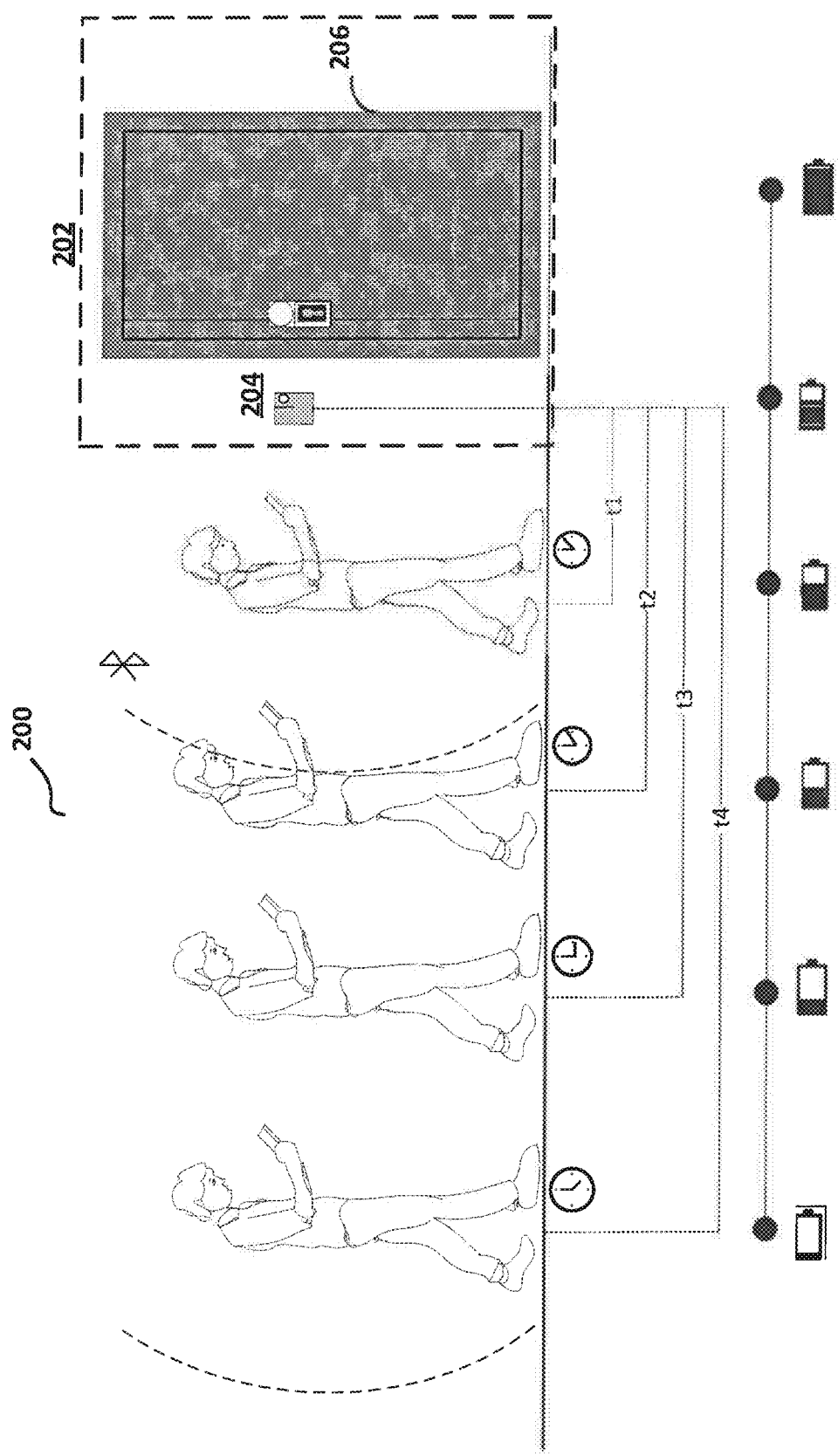
FIG. 2 is an exemplary diagram illustrating a method to access an access system in accordance with another embodiment of the invention.

FIG. 2 depicts a smart adjustment of signal strength by the access system (202) by using time to automatically calculate the correct signal strength required to send user credentials to the access system and gain access through the door (206). As the user approaches a communication module (204) associated with the door (206), the signal strength detected by the user terminal (104) increases. The access system (202) is configured to adjust the threshold signal strength such that the user has just enough time to access the door. The detected signal strength generally increases as the user with the user terminal approaches the communication module (204) which is represented by the signal strengths at the bottom in FIG. 2.

Various embodiments of the invention describe setting the time interval for accessing and configuring a signal strength to open the door (206). This time interval is the total time during which a user is able to send the user credentials and gain entry into the premises. By measuring the time interval between sending of the user credentials and door opening, the access system (202) can accurately calculate the time required by the user to gain access automatically. The calculation of time is performed based on the time stamps of various events. The access system is able to determine whether the time interval is sufficient or not and accordingly adjusts both the time interval as well as the threshold signal strength to provide access to a user. The access system (202) initially sets a default time interval of say, 5 seconds for user to access the door. The access system (202) determines a threshold signal strength to access the door (206) for the default time interval. Based on the threshold signal strength the user credentials are transmitted to the access system. It is to be noted that components of the access system are similar to as shown in FIG. 1. The user credentials thus sent, are validated by the access control unit (108) (credential server (110) and the database (112) as shown in FIG. 1) and accordingly, the access systems actuates the controller (120) to open the door (206). If the access system (202) determines that the user need more time interval to pass the door, the time interval can be increased. Alternatively, if the access system determines that the user needs less time to access the door, the time interval can be decreased. Based on the increase or decrease of the time interval, the threshold signal strength can be adjusted for accessing the door (206).

Specifically, the access request from the user terminal is received by the access point (116). The receipt of the access request from the user terminal by the access point (116) is time stamped and can be denoted as a first time stamp (t1). The access request is then transmitted to the controller (120). This event of receiving the access request by the controller is time stamped as a second time stamp (t2). The result of the access request, that is granting or denying the user an access is received by the access point (116) and is time stamped to a third time stamp (t3). The result of the access request may be processed by the access control unit of the access system. The access control unit (108) may validate the user credentials associated with the access request and return the result to the controller (120). The controller may then forward the result to the access point (116) and actuation command to open the door may be issued by the controller to the access point (116). Based on the actuation command the access or entrance associated with the access point is opened, which is time stamped as fourth time stamp (t4).

The access system determines the time interval adjustment based on the time stamps registered while the user accesses the door (206). The access control unit (108) adjusts the time interval based on the time stamps. The time interval is used by the signal strength adjustment unit (114) to adjust the threshold signal strength for the user of the user terminal.

Figure 3:
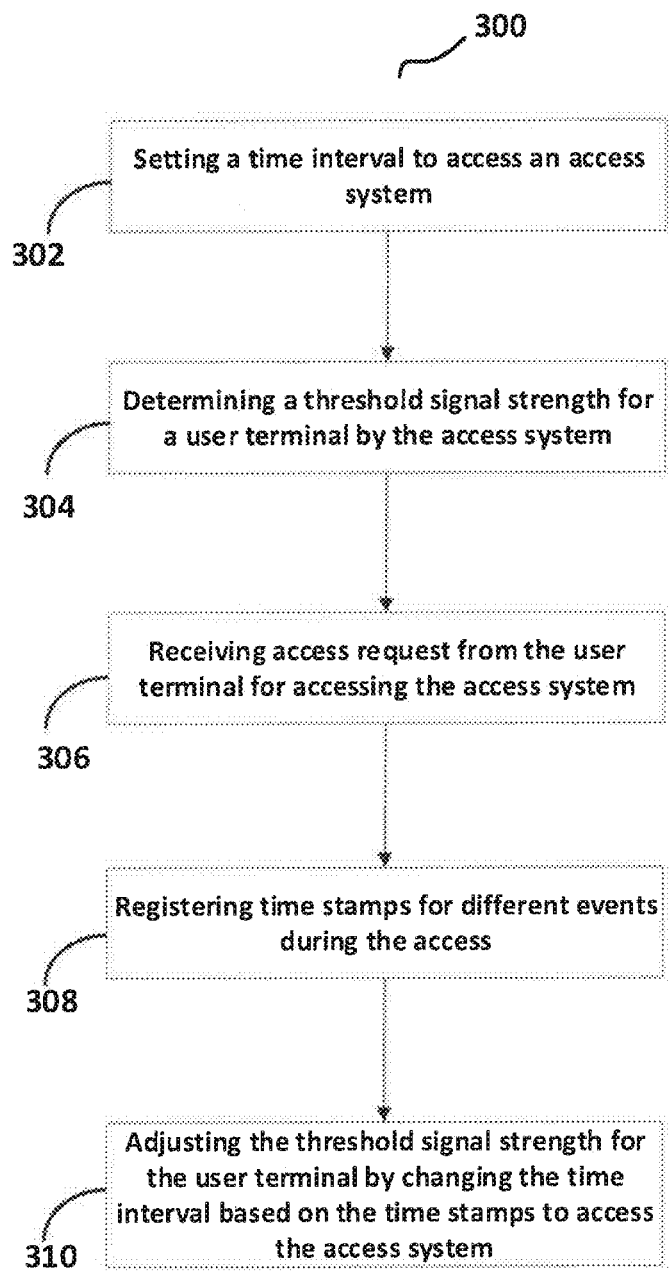
FIG. 3 is an exemplary flowchart depicting different steps to enable the invention according to an embodiment of the invention.

FIG. 3 depicts a flowchart outlining the features of the invention in an embodiment of the invention. The flowchart (300) describes a method being performed for enabling the invention. The method starts at (302) by setting a time interval to access an access system. After that, a threshold signal strength for a user terminal is determined by the access system (304). The user credentials are received from the user terminal for providing access to the access system (306). The time stamps for different events during the access are registered (308) as discussed above. This is followed by adjustment of the threshold signal strength for the mobile device by changing the time interval based on the time stamps to access the access system (310) as discussed above.

Figure 4:
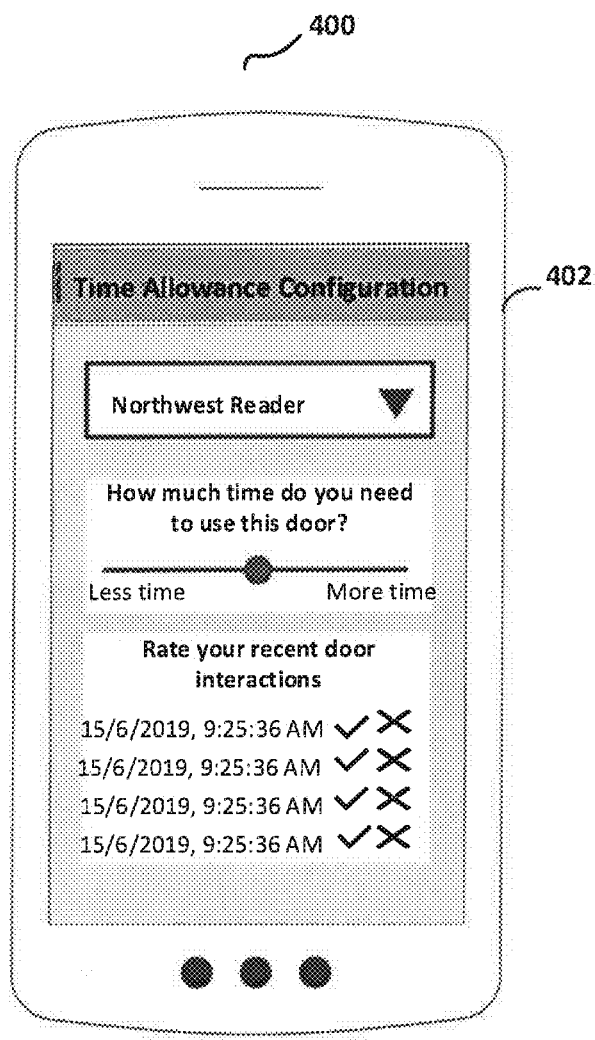
FIG. 4 is an exemplary screen on a user terminal depicting configuration according to an embodiment of the invention.

FIG. 4 depicts a user terminal (400) with a user interface (402) where the time interval for a specific access point or a door can be configured. The user can specify how much time is needed to use the door. The interface even allows the user to rate recent door interactions based on which the access system can increase or decrease the time interval and the threshold signal strength.

Another embodiment of the invention discloses a computer readable medium comprising one or more processors and a memory coupled to the one or more processors, the memory storing instructions which are executed by the one or more processors, the one or more processors are operable to set a time interval to access an access point of the access system. A threshold signal strength is determined for transmitting an access request from a user terminal to the access system through the access point. The access request is received and different time stamps are registered for different events during access of the access system. Based on the time stamps of different events the time interval is changed and the threshold signal strength is adjusted. The access request may be received automatically by the access system when the user with the user terminal arrives in the vicinity of the access point. The threshold adjusted by the access system is sent to the user terminal for using the adjusted threshold value next time. The user of the user terminal can also use the interface of the user terminal to request change in the time interval.

As discussed above, the different time stamps are used to determine the adjusted threshold value which is done by changing the time interval. In an embodiment of the invention, the time interval for accessing the access point may be the sum of the different time stamps registered by the access system. The change in time interval from previously known time interval is used for adjusting the threshold signal strength to access the access point.

The various embodiments of the invention described herein can be combined and performed to enable the invention and is within the scope of the invention.

The invention provides various advantages of seamlessly access the access systems such as entrances, doors etc. with automated security. The invention provides a frictionless and adaptable approach to access the security system. The user can adjust the time required for contactless entry without even showing the access device at any access point.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

Further reference to any content has been made throughout the specification and words and phrases such as "user device", "user terminal", "mobile terminal", "mobile phone", or the like have been interchangeably used and means the handheld device for installing the configuration for all the devices in the system. Moreover, the words and phrases like "cloud", "server", "cloud server" and "database" or the like have been interchangeably used which means a storage location located remotely for storing configuration and configuration updates for all the devices in the system. Further words and phrases like, access points "doors" or entrances or the like have been interchangeably used which means access points are associated with the doors for providing access inside the entrances and doors.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An access system comprising:
an access control unit configured to set a time interval for a user of user terminal to access an access point of the access system;
the access control unit configured to determine a threshold signal strength for accessing an access point;
the access control unit configured to register time stamps for different events while a user of the user terminal accesses the access system, wherein the access control unit is further configured to change the set time interval based on the registered time stamps;
the access point configured to receive an access request from the user terminal at the threshold signal strength; and
a signal strength adjustment unit configured to adjust the threshold signal strength for the user terminal based on the changed time interval.

2. The access system of claim 1, wherein the access point receives the access request and registers a first time stamp based on the access request.

3. The access system of claim 2, wherein the access system further comprises:
a controller configured to:
communicate with the access point to receive the access request and to register a second time stamp associated with the access request;
send the result of the access request to the access point, wherein the access point is configured to:
receive an actuation command to provide access and register a third time stamp associated with the actuation command;
provide the access and register a fourth time stamp associated with providing the access;
wherein the first, second, third, and fourth time stamps corresponds to time stamps for different events, wherein the first, second, third, and fourth time stamps are transmitted to the access control unit to change the time interval.

4. The system of claim 1, wherein the adjusted threshold signal strength is sent by the access system to the user terminal for the next use.

5. The system of claim 1, wherein the access system is configured to send a notification to the user terminal requesting a change of the time interval.

6. The system of claim 1, wherein the access request is automatically received by the access system on sensing the threshold signal strength.

7. A method for accessing an access system, the method comprising:
setting by an access control unit a time interval for a user of user terminal to access an access point of the access system;
determining by the access control unit a threshold signal strength for transmitting an access request from a user terminal to the access system;
receiving by an access point the access request from the user terminal;
registering by the access control unit time stamps of different events while the user is accessing the access point; and
adjusting by a signal strength adjustment unit the threshold signal strength for the user terminal by changing the set time interval based on the registered time stamps of different events.

8. The method of claim 7, wherein the access point receives the access request and registers a first time stamp based on the access request.

9. The method of claim 8, wherein the access system further comprises a controller for communicating with the access point to receive the access request and to register a second time stamp associated with the access request, wherein the controller sends the result of the access request to the access point.

10. The method of claim 9, wherein the access point is further configured to receive an actuation command to provide access and register a third time stamp associated with the actuation command and provide the access and register a fourth time stamp associated with providing the access.

11. The method of claim 10, wherein the first, second, third, and fourth time stamps correspond to time stamps for different events, wherein the first, second, third, and fourth time stamps are transmitted to the access control unit to change the time interval.

12. The method of claim 7, wherein the adjusted threshold signal strength is sent by the access system to the user terminal for the next use.

13. The method of claim 7, wherein the threshold signal strength can be adjusted manually by a user of the user terminal.

14. The method of claim 7, wherein the access request is automatically received by the access system on sensing the threshold signal strength.

15. The method of claim 7, wherein the user of the user terminal can adjust the threshold signal strength by modifying the time interval on a user interface of the user terminal.

16. The method of claim 7, wherein the access system is configured to send a notification to the user terminal requesting a change of the time interval.

17. A Non-transitory computer readable medium comprising one or more processors and a memory coupled to the one or more processors, the memory storing instructions which are executed by the one or more processors, the one or more processors configured to:
- set by an access control unit a time interval by an access control unit to access an access point of the access system;
- determine by the access control unit a threshold signal strength for transmitting an access request from a user terminal to the access system;
- receive by an access point the access request from the user terminal;
- register by the access control unit time stamps of different events while the user is accessing the access point; and
- adjust by a signal strength adjustment unit the threshold signal strength for the user terminal by changing the time set interval based on the registered time stamps of different events.

18. The computer readable medium of claim 17, wherein the access request is automatically received by the access system on sensing the threshold signal strength.

19. The computer readable medium of claim 17, wherein the adjusted threshold signal strength is sent by the access system to the user terminal for the next use.

20. The computer readable medium of claim 17, wherein the access system sends a notification to the user terminal requesting a change of the time interval.

\* \* \* \* \*